Dec. 8, 1959     K. T. ADAMS     2,916,320
COOKIE DROPPER
Filed Oct. 31, 1955
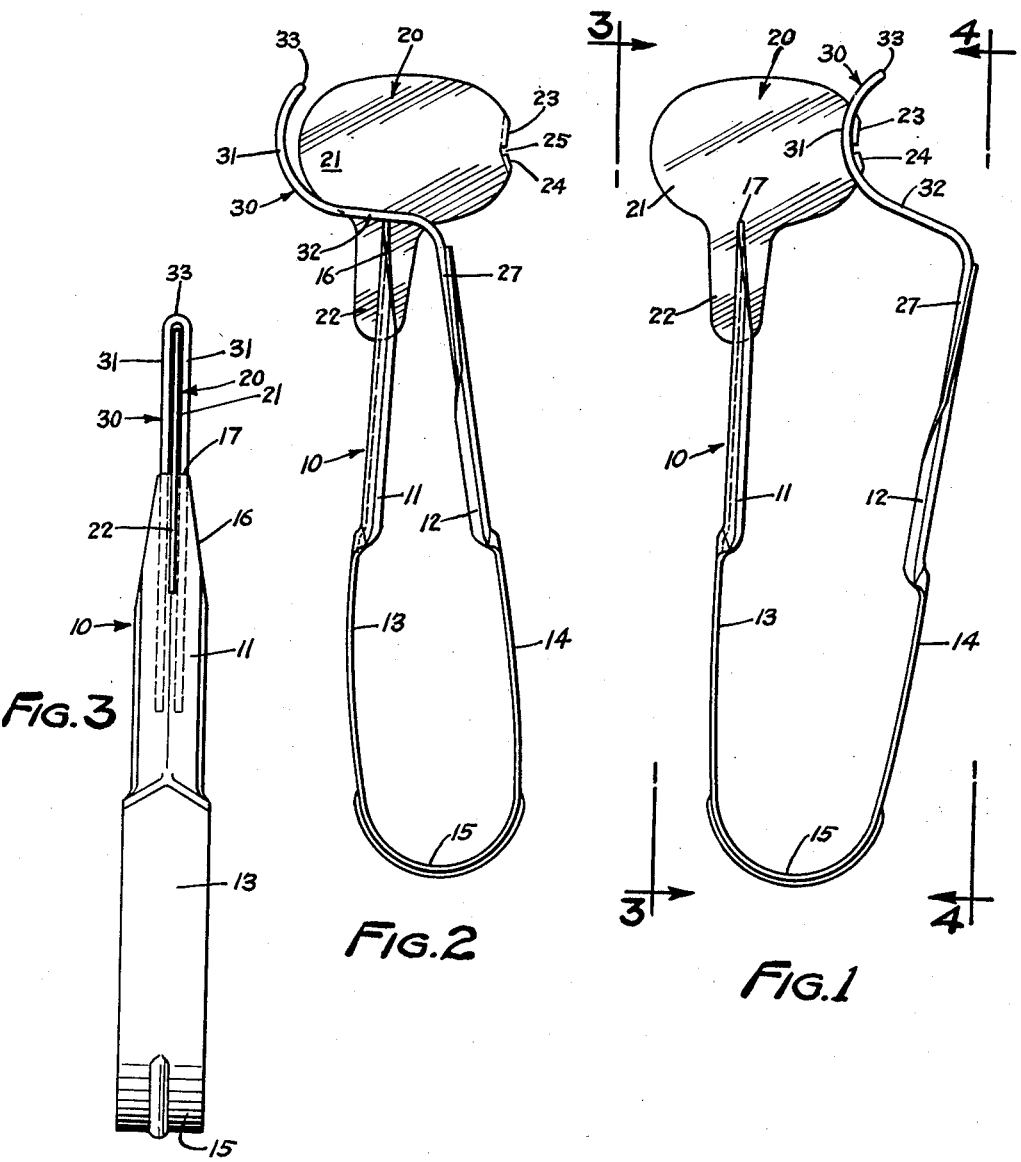
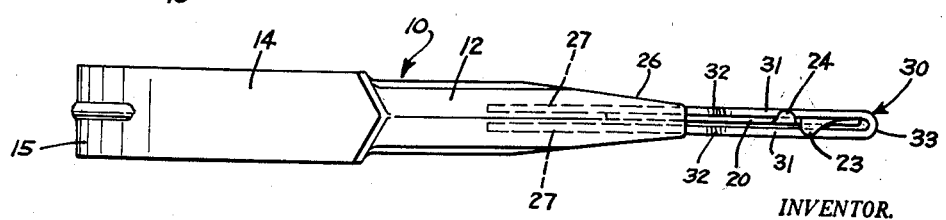
INVENTOR.
KENNETH T. ADAMS
BY
ATTORNEYS United States Patent Office 2,916,320
Patented Dec. 8, 1959

2,916,320

COOKIE DROPPER

Kenneth T. Adams, Monticello, Minn., assignor to Foley Manufacturing Company, Minneapolis, Minn., a corporation of Minnesota Application October 31, 1955, Serial No. 543,908

10 Claims. (Cl. 294—26.5)

This invention relates to new and useful improvements in a kitchen utensil of the type utilizable for gathering, lifting and depositing a small mass of plastic material such as cookie dough or the like. It particularly relates to new and useful improvements in a tong-like utensil which may be readily used in either hand and which is adapted for scooping, measuring and dropping small amounts of cookie dough in the baking of cookies of uniform size.

Objects of the invention are: to provide a new and useful instrument for dropping cookie dough or the like; which may be easily operated with one hand; and which is readily utilizable by either left-handed or right-handed persons; which will scoop and retain plastic dough and the like; which will provide a means for measuring equivalent amounts of cookie dough to be dispensed; and which will dispense and eject the dough quickly and cleanly without using a cooperating scraper or utensil. In such manner, in the baking of cookies, the device is particularly useful in that it will gauge the dough and provide cookies of uniform size.

Other objects of the invention reside in the specific tong-like structure including the supporting spatulate form and the finger ejector and to the other specific constructional details of the device.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the four figures of the drawings, in which corresponding numerals refer to the same parts and in which:

Figure 1 is an elevational view of the invention in at rest position;

Figure 2 is a view similar to Figure 1 but showing the invention in position after ejecting the plastic mass from the spatulate form;

Figure 3 is a view taken along the line and in the direction of the arrows 3—3 of Figure 1; and Figure 4 is a view taken along the line and in the direction of the arrows 4—4 of Figure 1.

Throughout the specification and claims, and in the preferred modification, the device will be treated as a cookie dropper and will be described with reference to its use in gathering and dispensing cookie dough for the baking of cookies. However, such treatment will be in view of the foregoing explanation.

Reference now to the drawings and particularly to Figure 1, will show the cookie dropper generally designated 10 comprising a tong structure 11—15, the respective tong arms 13 and 14 being provided with an outwardly convex thumb engaging rest or portion 11, and an outwardly convex finger engaging portion or rest 12, integrally joined thereto, the arms 13 and 14 being connected by a resilient U-portion 15. The arm 13 and portion 11 and arm 14 and portion 12, cooperating with U-portion 15, will operate in the manner of tongs as is well understood.

Thumb engaging rest or portion 11 is of the configuration shown best in Figures 1 and 3 and has its edges inturned to provide a slightly outwardly directed convex surface which forms the thumb rest or grip. This is so whether the device is used by right-handed persons or left-handed persons. As shown in the drawings, the device is in position and intended to be grasped by right-handed persons, but it is to be understood that it may equally well be used by left-handed persons and so grasped merely by reversing the device.

The finger engaging rest or portion 12 likewise has inturned edges to provide a slightly outwardly convex surface.

The outwardly convex portion 11 is tapered at 16 and provided with a longitudinally extending recess, extending inwardly from the end 17 for the reception of the tabular portion 22 of spatulate form 20. Spatulate form 20 is provided with a plate portion 21 and a lobe or elongated tab 22 protruding therefrom, tab 22 being positioned in the recess in portion 11 and secured thereto.

Spatulate form 20 is provided at one end (the rightward end with reference to Figures 1 and 2) with a pair of oppositely turned limit flanges 23 and 24 separated by a recess 25 and forming a retaining means, all as shown in Figures 2 and 4. As will be appreciated by viewing Figures 1 and 2, the plate portion 21 is a planar oval shape.

Thumb rest 11 and arm 13 thus form one side of the tong structure 11—15 and finger rest 12 and arm 14 form the other side of the tong.

Rest 12 is likewise tapered at 26 similar to taper 16 for rest 11. Fixed to the interior of the tapered portion 26 are the stems 27 of the double loop finger ejector 30. The finger ejector 30 comprises the stems 27 offset from linear portion 32 as shown in Figures 1 and 2 and joined to curved portion 31, the two curved portions 31 being connected at end 33 and forming a wiper member. Thus, the finger ejector 30 might be said to comprise a wire-like member doubled back upon itself at 33 to form a loop having parallel portions 31, 32 and 27.

In use, rest 12 is engaged by the fingers of the operator, when used by either a right-handed or left-handed person and rest 11 is engaged by the thumb of the operator in similar fashion. In use by a right-handed person, the device will be grasped in the position of Figure 1, and when used by a left-handed person, it will be flipped over so that the spatulate form 20 will be positioned at the right of the device rather than at the left of the device as shown in Figure 1. When grasped as shown in Figure 1 by the right hand, the fingers will extend over the tongs 11—15 and curl around rest 12 with the thumb engaging rest 11 to apply pressure thereto. Spatulate form 20 may then be dipped into a plastic mass, dough or other material used, and will measure off a portion determined by the extent of the plate portion 21. The mass may then be scooped or lifted and transferred to the place being used at which time plate 21 will be tilted slightly in the direction of the surface where the mass is desired to be dropped, the fingers will bias the rest 12, arm 14 and consequently finger ejector 30 from the index position of Figure 1 to the position of Figure 2 whereupon the mass will be ejected from plate 20 by engagement with one of the portions 31 of finger ejector 30. The grasp by the operator may be reversed so that the fingers engage rest 11 and the thumb engages rest 12 as desired. In that fashion the fingers will extend under the tongs.

Since there is a portion 31 provided on either side of the plate 20, both sides will be scraped as the device is moved from the position of Figure 1 to the position of Figure 2 and will be kept clear of dough, etc.

The arm 12, 14 will move from the position of Figure 1 to the position of Figure 2 and will be limited in the position of Figure 2 (the dough ejecting position), by engagement of portion 32 with end 17 or engagement of end 27 with tab 22 depending upon the relative dimensions involved. As shown the limit position is provided by engagement with portion 32 with end 17.

When biasing pressure is released, that is, the squeezing action of the hand of the operator is removed, the natural resiliency of the tong arms 11—15 will force the device and the finger ejector 30 into the position of Figure 1, whereupon the portion 31 will engage the flanges 23 and 24 for determining limit position.

As many widely differing embodiments of this invention may be made without departing from the spirit and scope thereof, it is to be understood that the specific embodiments described are given by way of example only and the invention is limited only by the terms of the appended claims.

What is claimed:

1. In combination a member forming a U-shaped tong having extending arms, one of said extending arms having a substantially flat spatulate member positioned thereon, the other of said extending arms having an ejector member secured thereto, said spatulate member having limit means at one edge, said ejector member engaging said limit means when said arms are in normal position, and including a wiper portion for wiping a surface of said spatulate member as said arms are biased together.

2. A cookie dropper or the like comprising a spatulate form having flange means at one edge thereof, said spatulate form being provided with a tabular extension joined to a tong arm, a second tong arm connected at one end to said first tong arm and having means forming an ejector member secured to the other end thereof, said ejector member when in index position engaging said flange means, and said ejector member movable when said tong arms are squeezed together to wipe at least one surface of said spatulate form.

3. The structure of claim 2 further characterized by said ejector member comprising a portion positioned on each side of said spatulate form.

4. The structure of claim 2 further characterized in that said ejector comprises a doubled back loop comprising a portion engaging each of the top and bottom surfaces of said spatulate form and stem ends connected to said second tong member.

5. A tong-like structure having a plurality of arms, means forming a planar member at the end of one of said arms and means forming a wiper member at the end of the other of said arms and movable from a first to a second position for wiping a surface of said planar member.

6. The structure of claim 5 further characterized in that said planar member comprises an ovate shape secured to one of said tong arms.

7. The structure of claim 6 further characterized in that said wiper member comprises a finger ejector having a curved portion engaging the surface of said ovate member.

8. The structure of claim 6 further characterized in that said wiper member comprises a portion positioned on either side of said planar member.

9. The structure of claim 7 further characterized by flange means on said spatulate member for determining a limit position of said ejector member.

10. In combination a member forming a U-shaped tong element and having extending arms, means forming a finger engaging portion on one of said extending arms and means forming a thumb engaging portion on the other of said extending arms, a substantially flat spatulate member positioned on said arm having said thumb engaging portion, said spatulate member having limit means for engaging an ejector member, an ejector member secured to said arm having said finger engaging portion, said ejector member engaging said limit means when said arms are in said normal position, and said ejector means including a wiper portion for wiping a surface of said spatulate member.

References Cited in the file of this patent

UNITED STATES PATENTS

| 1,829,842 | Tsavaris | Nov. 3, 1931 |
| 2,496,908 | Dowx | Feb. 7, 1950 |
| 2,690,657 | Milwoski | Oct. 5, 1954 |
| 2,696,177 | Anello et al. | Dec. 7, 1954 |

FOREIGN PATENTS

| 64,680 | Netherlands | Oct. 15, 1949 |